(12) United States Patent
Kuhlman, III et al.

(10) Patent No.: US 11,532,220 B2
(45) Date of Patent: Dec. 20, 2022

(54) SYSTEM FOR TEST AND MEASUREMENT INSTRUMENTATION DATA COLLECTION AND EXCHANGE

(71) Applicant: Tektronix, Inc., Beaverton, OR (US)

(72) Inventors: Frederick B. Kuhlman, III, Nashville, TN (US); Shane L. Arnold, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 16/695,980

(22) Filed: Nov. 26, 2019

(65) Prior Publication Data

US 2020/0168066 A1 May 28, 2020

Related U.S. Application Data

(60) Provisional application No. 62/772,051, filed on Nov. 27, 2018.

(51) Int. Cl.
*G08B 13/196* (2006.01)
*H04N 1/00* (2006.01)
(Continued)

(52) U.S. Cl.
CPC . *G08B 13/19656* (2013.01); *G08B 13/19697* (2013.01); *H04N 1/00132* (2013.01);
(Continued)

(58) Field of Classification Search
CPC ........ G08B 13/19656; G08B 13/19697; H04N 1/00132; H04N 2101/00; H04N 5/23206;
(Continued)

(56) References Cited

U.S. PATENT DOCUMENTS 10,741,087 B1 * 8/2020 Picardi ................... G05D 1/101
2009/0313347 A1 12/2009 Engel
(Continued)

OTHER PUBLICATIONS

European Patent Office, International Search Report and Written Opinion for International Application No. PCT/US2019/063494, dated Feb. 20, 2020, 10 pages, Rijswijk, NL.
(Continued)

*Primary Examiner* — Dakshesh D Parikh
(74) *Attorney, Agent, or Firm* — Miller Nash LLP; Andrew J. Harrington

(57) ABSTRACT

A method of capturing instrument data using a communications device includes sending an actuation signal to a camera to take a photograph of at least one instrument, one of either transmitting or receiving a trigger message between the communications device and the at least one instrument, storing the photograph in a memory on the communications device, determining associated information for the photograph, and transmitting the photograph, associated information and user information to a network. A communications device has a camera having an actuator, at least one communications link, a memory, and a processor configured to execute instructions that cause the processor to: send an actuation signal to the camera to take a photograph of an instrument when a user activates the actuator; send a trigger message to the instrument to save instrument data; store the photograph in the memory with associated information about the photo including user information; and transmit at least the photo, associated information, and the user information to a remote location.

18 Claims, 2 Drawing Sheets

(51) Int. Cl.
H04N 5/232 (2006.01)
H04N 101/00 (2006.01)
(52) U.S. Cl.
CPC ..... *H04N 5/23206* (2013.01); *H04N 5/23241* (2013.01); *H04N 2101/00* (2013.01); *H04N 2201/0084* (2013.01)
(58) Field of Classification Search
CPC ....... H04N 5/23241; H04N 2201/0084; H04Q 2209/40; H04Q 2209/50; H04Q 2209/86; H04Q 9/00
See application file for complete search history.

(56) References Cited

U.S. PATENT DOCUMENTS

| | | | |
|---|---|---|---|
| 2010/0077260 A1* | 3/2010 | Pillai | G06F 11/263 |
| | | | 714/E11.178 |
| 2013/0270160 A1* | 10/2013 | Enjouji | A61M 1/1656 |
| | | | 210/96.2 |
| 2014/0032637 A1 | 1/2014 | Weir | |
| 2015/0051863 A1 | 2/2015 | Tsuchida et al. | |
| 2015/0095717 A1* | 4/2015 | Frenz | G06F 11/323 |
| | | | 714/46 |
| 2018/0107533 A1 | 4/2018 | Itou et al. | |
| 2021/0166366 A1* | 6/2021 | Kong | G06T 7/33 |

OTHER PUBLICATIONS

Korean Intellectual Property Office, International Search Report and Written Opinion for International Application No. PCT/US2021/034630, dated Sep. 16, 2021, 9 pages, Daejon, Republic of Korea.

\* cited by examiner

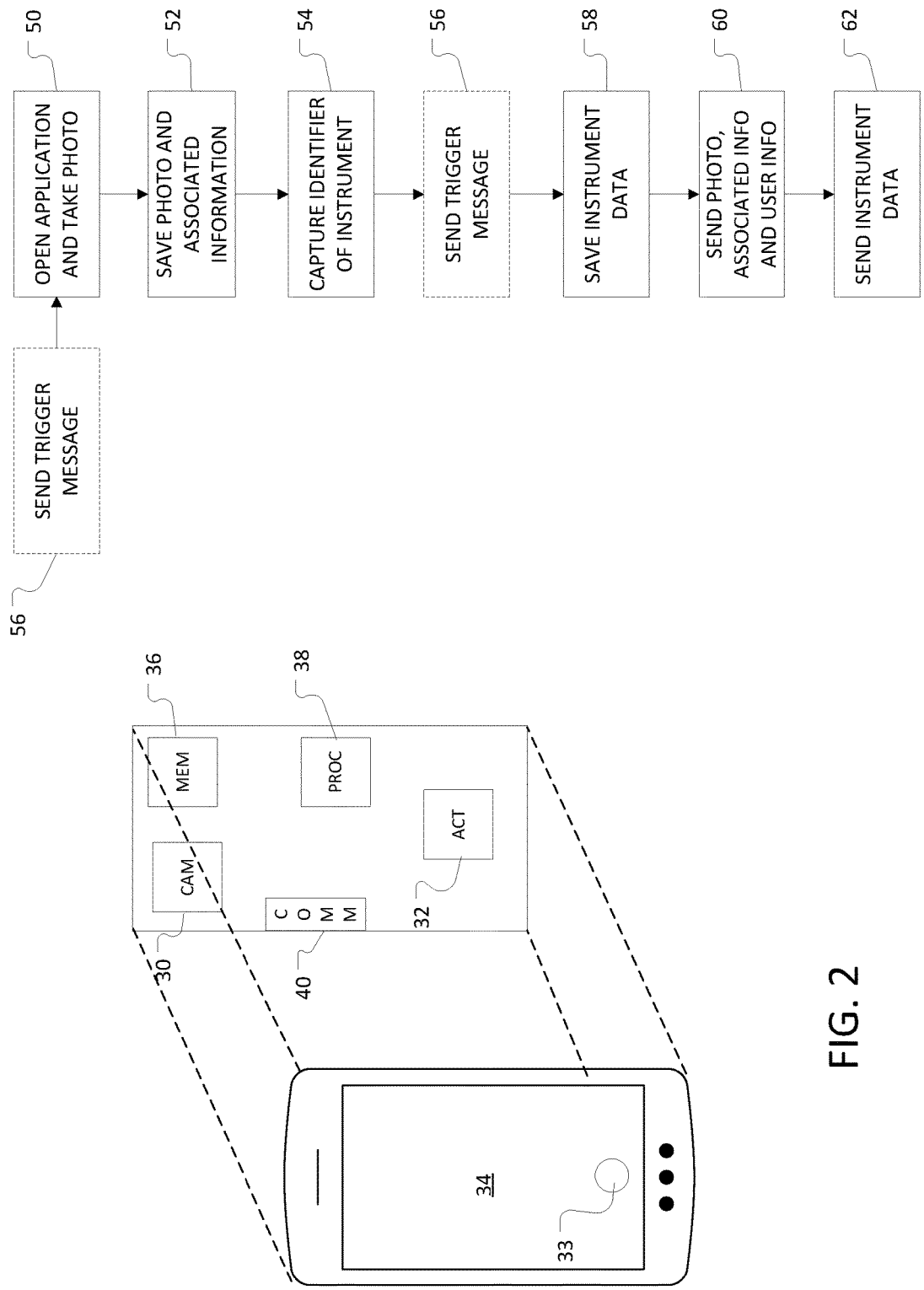

SYSTEM FOR TEST AND MEASUREMENT INSTRUMENTATION DATA COLLECTION AND EXCHANGE

RELATED APPLICATIONS

This application is a continuation of, and claims priority to, U.S. Provisional Patent Application No. 62/772,051, filed Nov. 27, 2018.

FIELD

This disclosure relates to set ups for instruments, more particularly to a system for collecting and exchanging data from instruments.

BACKGROUND

Users of test and measurement instruments, such as oscilloscopes, often use the instruments in complex setups that may include multiple instruments connected to one or more devices under test (DUTs), sometimes through specialized adapters, cables, or probes. Such an instrumentation setup may be used to perform a particular type of test or particular measurement on a DUT. Users often have a need to document the test setup so that it can be duplicated or recreated at a later time, for example to compare test data from multiple DUTs. Users also often need to obtain data from one or more test and measurement instruments involved in the setup, and need to share that data with other users, other test and measurement instruments, or other systems, either directly, or indirectly, for example via a network cloud-based service.

BRIEF DESCRIPTION OF THE DRAWINGS

FIG. 2 shows an embodiment of a communications device.

FIG. 3 shows a flowchart of a method of capturing instrumentation data for storage and exchange.

DETAILED DESCRIPTION

Figure 1:
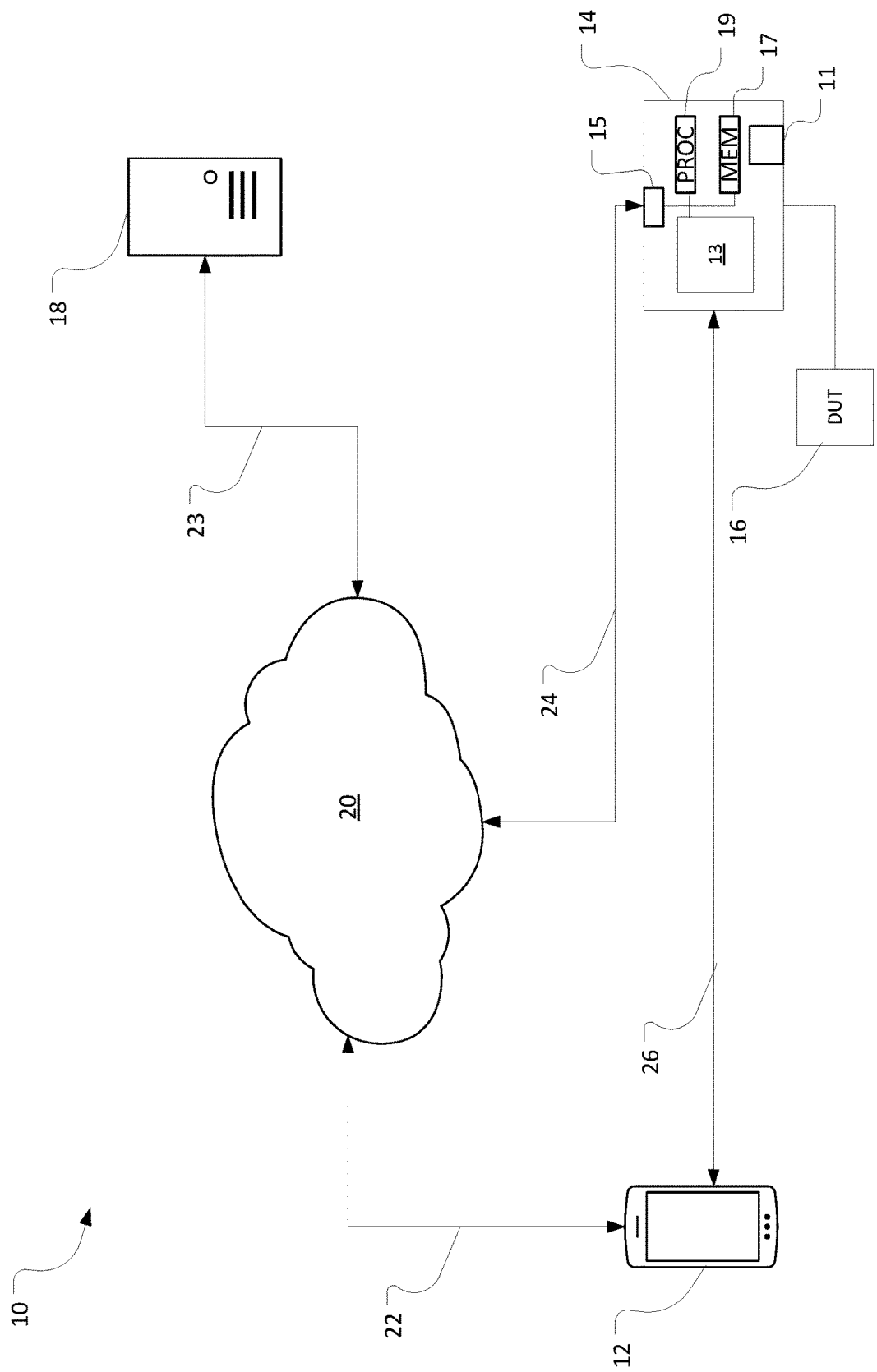
FIG. 1 shows an embodiment of a system having a communications device, a test and instrumentation set up and a server.

In embodiments, the disclosed technology includes an application on a smartphone or other communications device that allows users to perform an action, for example, take one or more pictures of the test and measurement instrumentation setup. This action triggers a system that combines the picture or pictures of the physical setup with other data from the oscilloscope or other test and measurement instruments. The picture of the physical setup may show where each instrument channel is connected, what type of hardware is being probed, meaning what type of device under test (DUT) is connected, a picture of the particular test and measurement instruments being used such as model number and serial number or other identifying information, and other characteristics of the physical setup. The data from the oscilloscope or other test and measurement instrument may include information on the instrument configuration, screenshots of the current state of the instrument, and structured waveform and measurement data files.

The following discussion will use several terms to encompass various topics. The term "communications device" means a device, such as a smartphone, tablets, computing devices with web cameras, or future devices that may take the place of smartphones, which may include a stand-alone digital camera, a circuit camera, microscope, or thermal camera with network and/or other connections. The communications device has at least one communications link that allows the device to communicate with the instrument being photographed, at least as far as sending a message to the instrument, and may use that same or other communications link to communicate with a remote server or storage. The communications device has a processor that executes code that enables it to communicate, a camera, an actuator to activate the camera, and a memory.

The term "photograph" encompasses any picture or image, such as visual images, thermal images, or images resulting from other techniques, such as spectrum techniques, captured by the camera on the communications device, typically stored as a digital image file. These terms will be used interchangeably to refer to this captured image or photograph.

The term "instrument" as used here means a device that gathers data, either a test and measurement device, referred to here as a measurement device, such as an oscilloscope, various kinds of meters, etc., or a sensor that gathers some sort of environmental data, such as temperature, wind speed, humidity, light intensity, sound levels, etc. These are just some examples and are in no way intended to limit the discussion to these particular examples.

The term "instrument data" means the data that the instrument has gathered and may include, but is not limited to: the instrument configuration and/or settings of any instrument involved in the set up; screen shots of the display of the instrument or instruments; the model and serial number of the instrument or instruments; a particular test or a particular step of a test that the instrument is performing on a device under test; the structured waveform applied to, or acquired from, the device under test; and the state of the instrument such as the CPU load, instrument set up information, enabled software licenses on the instrument, any other state-based information. In the case of a measurement instrument, the information may include connections between the instrument and any other devices, such as other measurement instruments; and measurement data files.

In the embodiment where the instrument is a sensor, the instrument data may include the type of the sensor, its current state, the make and model of the sensor, time and/or date stamps of samples stored by the sensor of whatever parameter it is sensing, etc.

The term "associated information" means information associated with the photograph that is gathered by the communications device. Some types of the associated information may include similar or the same information listed as being instrument data, but the difference between instrument data and associated information is that the instrument data is gathered by the instrument and the associated information is gathered by the communications device. In one embodiment, for example, the associated information may include instrument data, in an embodiment where the communications device receives the instrument data from the instrument directly, but the instrument data was initially gathered by the instrument. Associated information may include date and/or time stamps, location, manual or automatic tags, as well as many other types of information that may be gathered by the communications device at the time the photograph is taken.

"User information" as used here will typically be gathered from the communications device. It may identify the user, provide information for a user account, such as an email account, a cloud account or other storage account, including user names and passwords. This allows the photograph, associated data, and instrument data, if separate, to be stored in that user's account.

Using the application, a user can capture the physical test setup photographs and cause the instrument to send the instrumentation data. This collection of data containing images, photographs, waveforms, measurements, manual or automatic user tags, date and/or time stamps, location, etc. and may be stored locally on the smartphone or may be automatically sent to a central storage location.

FIG. 1 shows an embodiment of a system 10 in which a communications device 12 and an instrument 14 are connected through a network 20 through communications links 22 and 24, respectively. A server 18 may be a proprietary server owned by the entity that owns the instrument 14 and possibly the user's communication device 12, or may be a cloud server on which the entity has accounts. The server 18 connects to the other devices through the network 20 by connection 23. In addition, the communications device 12 and the instrument 14 may have a communications link 26 through port 15. The instrument 14 may have a processor 19 and a memory 17, in addition to the display 13. The figure shows the communications link 26 as being bi-directional, but as discussed below, may actually be a one-way link between the communications device 12 and the instrument 14. Also, as shown the instrument 14 is connected to a device under test (DUT) 16, but this is just one embodiment and the instrument 14 could be a sensor, in which case the DUT would not be there.

As mentioned above, the communications device may be what is commonly referred to as a smartphone, or whatever future embodiments of a smartphone entail. FIG. 2 shows one embodiment of such as device 12. The device has a camera 30 that will take the photograph of the instrument when the user activates the actuator. In current smartphones, for example, the actuator is an image of a button 33 on a user interface such as 34, which is typically a touch screen display. The activation of the actuator 32 will cause the device to send a message through the communications link 40 to the instrument. This will then result in a photograph that is stored in the memory 36, at least temporarily. A processor 38 controls these processes and may have a connection to the camera, the actuator, the memory, the communications link and the user interface.

FIG. 3 shows a flow chart for some embodiments of the process. In a first embodiment, the user opens an application on the communications device and takes a photograph of the instrument set up at 50, wherein the instrument set up includes at least one instrument and may include a DUT. The process then saves the photograph and associated information on the communications device at 52.

At 54, if necessary, the user may need to capture an identifier for the instrument. This may involve presenting the user with a list of possible instruments on the user interface of the communications device to allow the user to select the relevant instrument. Such selecting may be done by model number and serial number, or by another unique identifier of the instrument. Alternatively, the user could use the communications device, from within the application, to scan a QR code or a UPC on the instrument, or to read an RFID tag, where those codes or tags, such as 11 in FIG. 1, identify the instrument. One should note that the capture of the identifier could occur before or after the capturing of the photograph, as well as before or after sending the trigger message, as discussed below.

The identifier, if needed, would be included in the information associated with the photograph. One should note that capturing the identifier might not be needed. The system could use other means to identify the instrument, such as analysis of the photograph to identify the make and model of the instrument, etc.

The communications device uses the taking of the photograph as an indication to send a trigger message to the instrument at 56. The trigger message triggers the instrument to save the instrument data at 58. In one embodiment, the communications device sends the photograph, associated information, and user information through the network to the server 18 from FIG. 1 at 60. The instrument would then send the instrument data through a separate link to the network at 62 to be combined at the server or other location remote from the communications device. This may be due to security concerns for proprietary information, etc.

In another embodiment, the instrument receives the trigger message at 56, saves the instrument data at 58, and then transmits it back to the communications device. The communications device then includes the instrument data in the information associated with the photograph and then sends the information to the server 18 at 60, making 62 an optional step. The processor 19 of the instrument may save the instrument data in the memory 17, as the processor executes instructions that cause the processor to operate in this manner.

In addition, in some embodiments, the application on the communications device can emulate a memory device, such as a USB flash drive, such that it can use the local memory on the communications device to act as a data transfer mechanism for instrumentation set ups or sensors. This data transfer mechanism may be used to move data from one device to another, such as from one test and measurement instrument to another, or to use the data connection in the phone to transfer the data to a central storage location as mentioned above. In this embodiment, the processor is configured to execute instructions that cause the processor to save information received through the communications link, wherein that information includes a photograph of the test and measurement device. When used as a USB memory, the communications device may be connected to a different instrument in a different set up later, and the information could then be uploaded from the communications device to allow the current set up to replicate the previous instrument set up. In addition, the application may also recall the saved setup and data onto that instrument or another instrument from the remote location. Users could also share information between themselves in addition to storing the information on the server and giving other users access.

While the flow of the process of FIG. 3 may lead one to conclude that those processes must appear in a particular order, no such limitation is intended nor should one be inferred. For example, the actuation signal of the communications device may occur nearly simultaneously with the sending of the trigger message, from the communications device to the instrument, with the management of the photo and associated information occurring later.

In another embodiment, the instrument could send the trigger message to the communications device and cause the communications device to take the image, with the instrument triggering itself to save data. The instrument triggering itself could be from a dedicated button or other control on the instrument, or may occur as result of events on the instrument. The user may already have the application open on the communications device and when it receives the trigger message, the communications device takes the picture. In other embodiments, the user may have set up a communications device equipped with a digital camera on a tripod or other fixed mounting point, and the instrument sends the trigger message to the device to take the photo.

Many test instruments have triggers, sometimes referred to as acquisition triggers, especially in the context of an oscilloscope. The instrument could start the whole sequence. The acquisition trigger on the instrument, when activated, would then cause the instrument to send the trigger message. Some instruments have a feature that causes the instrument to save data upon a trigger. The instrument would then save in response to the acquisition trigger. FIG. 3 shows the process 56 in dashed boxes because it could occur in a different sequence than what may otherwise be implied.

Embodiments of the disclosed technology may use various connection options to the oscilloscope or other test and measurement instrument, in order to initiate a measurement and/or collect and transfer data. For example, connection options between the smartphone application or other embodiments of the communications device and the test and measurement instrument may include local LAN, Cloud connected, USB connected, and other communication interfaces such as Wi-Fi, Bluetooth®, Bluetooth® Low Energy (BLE), Near-Field Communication (NFC), Z-wave, cellular, infrared, etc. This link may also consist of the images of the instrument identifier, such as the QR, UPC, OCR (optical character recognition), or image processing that can recreate the waveforms from the images of the waveform. The identifiers could be used to transfer data between the instrument and the communications device.

The disclosed technology can apply to all test and measurement instrumentation. Such instrumentation can even include sensors. For example, embodiments of the disclosed technology also include using the smartphone application to take a picture of a sensor at 50, and saves the photograph at 52. This photographing action sends the trigger message at 56 to capture the current state of the sensor at 58, either at the sensor or at the communications device. The photographing action may also capture an identifier of the sensor at 54. The data being sent to a server at 60 may take the form of creating a streaming data bucket for that sensor in a cloud-based service for data collection, visualization, and analysis, for example the services offered by Initial State at www.initialstate.com.

Many types of instrument data from the instrument can be bundled with the photograph. Things like tagging, time/date, location, and a host of other things may all be part of the data package that is collected and saved or transferred, whether captured at the instrument or the communications device. As mentioned previously, associated information is gathered by the communications device and may include the instrument data, but the instrument data is initially gathered by the instrument.

In this disclosure, the singular forms "a," "an," and "the" include plural referents unless the context dictates otherwise. The term "or" as used here is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value.

The aspects of the present disclosure are susceptible to various modifications and alternative forms. Specific aspects have been shown by way of example in the drawings and are described in detail herein. However, one should note that the examples disclosed herein are presented for the purposes of clarity of discussion and are not intended to limit the scope of the general concepts disclosed to the specific aspects described herein unless expressly limited. As such, the present disclosure is intended to cover all modifications, equivalents, and alternatives of the described aspects in light of the attached drawings and claims.

References in the specification to aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

Additionally, this written description refers to particular features. One should understand that the disclosure in this specification includes all possible combinations of those particular features. For example, where a particular feature is disclosed in the context of a particular aspect, that feature can also be used, to the extent possible, in the context of other aspects.

Aspects of the disclosure may operate on a particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid-state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description refers to particular features. One should understand that the disclosure in this specification includes all possible combinations of those particular features. For example, where a particular feature is disclosed in the context of a particular aspect, that feature can also be used, to the extent possible, in the context of other aspects.

In addition, when this application refers to a method having two or more defined steps or operations, the defined steps or operations can be carried out in any order or simultaneously, unless the context excludes those possibilities.

EXAMPLES

Illustrative examples of the technologies disclosed herein are provided below. An embodiment of the technologies may include any one or more, and any combination of, the examples described below.

Example 1 is a method of capturing instrument data using a communications device, comprising: sending an actuation signal to a camera in the communication device to take a photograph of at least one instrument; one of either transmitting or receiving a trigger message between the communications device and the at least one instrument; storing the photograph in a memory on the communications device; determining associated information for the photograph; and transmitting the photograph, associated information and user information to a network.

Example 2 is the method of Example 1 wherein the communications device transmits the trigger message to the at least one instrument, in response to the photograph being taken.

Example 3 is the method of either Example 1 or Example 2, wherein the communications device receives the trigger message prior to sending the actuation signal to the camera.

Example 4 is the method of any one of Examples 1-3, further comprising receiving a message from the instrument, wherein the message includes instrument data, wherein the associated information for the photograph includes the instrument data.

Example 5 is the method of any one of Examples 1-4, further comprising transmitting the photograph, associated information, and the user information to a server, and storing occurs on the server, wherein the server comprises one of a cloud server or a proprietary server.

Example 6 is the method of any one of Examples 1-5, further comprising transmitting the photograph, associated information, and the user information to a server, wherein the associated information does not include instrument data, wherein combining of the instrument data with the photograph, associated information, occurs on the server.

Example 7 is the method of Example 2, wherein sending the trigger message from the communications device to the at least one instrument comprises sending the trigger message to a sensor and instrument data gathered from the instrument includes sensor data.

Example 8 is the method of Example 7, further comprising creating a streaming data bucket for the sensor on a cloud-based service.

Example 9 is the method of Example 2, wherein transmitting the trigger message to the at least one instrument comprises sending the trigger message to a test and measurement device, and instrument data comprises at least one of: a configuration of the test and measurement device; waveform data; measurement data; connections for channels on the test and measurement device; a type of a device under test; time stamp; date stamp; state information of the test and measurement device; and location.

Example 10 is the method of any one of Examples 1-9, further comprising acquiring an identifier of the at least one instrument prior to transmitting the trigger message, wherein the identifier comprises one of a QR code, a UPC code from the instrument using the communications device, or a user-provided selection from a menu of instrument identifiers on a user interface of the communications device.

Example 11 is a communications device, comprising: a camera having an actuator; at least one communications link; a memory; and a processor configured to execute instructions that cause the processor to: send an actuation signal to the camera to take a photograph of an instrument when a user activates the actuator; send a trigger message to the instrument to save instrument data; store the photograph in the memory with associated information about the photo including user information; and transmit at least the photo, associated information, and the user information to a remote location.

Example 12 is the communications device of Example 11, wherein the communications device comprises one of a smart phone, a tablet, or a computing device with a camera.

Example 13 is the communications device of one of either Example 11 or Example 12, wherein the at least one communications link comprises at least one of the group consisting of: a cellular connection; wireless fidelity (Wi-Fi); near field communications (NFC); Ethernet; a USB connection; Z-wave; Bluetooth®; and Bluetooth® Low Energy.

Example 14 is the method of any one of Examples 11-13, wherein the instructions that cause the processor to send the trigger message also cause the processor to receive and store the instrument data from the instrument on the communications device.

Example 15 is the communications device of Example 14, wherein the associated information includes the instrument data from the instrument.

Example 16 is the method of any one of Examples 11-15, wherein the instrument data includes at least one of images, waveforms, measurements, instrument configuration settings, sensor data, and instrument identification data.

Example 17 is the method of any one of Examples 11-16, wherein the processor is further configured to execute instructions that cause the processor to identify the instrument prior to sending the trigger message.

Example 18 is a test and measurement device, comprising: at least one communications link; a memory; and a processor configured to execute instructions that cause the processor to: receive a trigger message through the communications link; save instrument data into the memory; and transmit the instrument data to a location remote to the test and measurement device.

Example 19 is the test and measurement device of Example 18, wherein the processor is further configured to execute instructions that cause the processor to send the trigger message through the communications link.

Example 20 is the test and measurement device of one of either Examples 18 or Example 19, wherein the processor is further configured to execute instructions that cause the processor to save information received through the communications link, wherein that information includes a photograph of the test and measurement device.

The previously described versions of the disclosed subject matter have many advantages that were either described or would be apparent to a person of ordinary skill. Even so, all of these advantages or features are not required in all versions of the disclosed apparatus, systems, or methods.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A method of capturing instrument data using a communications device, comprising:
   sending, by a user, an actuation signal to a camera in the communication device to take a photograph of a test set up including at least one instrument;
   transmitting a trigger message from the communications device to the at least one instrument in response to the actuation signal, the trigger message to cause the at least one instrument to store instrument data;
   storing the photograph in a memory on the communications device;
   determining associated information for the photograph; and
   transmitting the photograph, associated information and user information to a remote location from the communications device.

2. The method as claimed in claim 1, further comprising: receiving a message from the instrument, wherein the message includes instrument data, wherein the associated information for the photograph includes the instrument data.

3. The method as claimed in claim 1, further comprising transmitting the photograph, associated information, and the user information to a server, and storing occurs on the server, wherein the server comprises one of a cloud server or a proprietary server.

4. The method as claimed in claim 1, further comprising transmitting the photograph, associated information, and the user information to a server, wherein the associated information does not include instrument data, wherein combining of the instrument data received from the instrument at the server with the photograph, associated information, occurs on the server.

5. The method as claimed in claim 1, wherein transmitting the trigger message from the communications device to the at least one instrument comprises sending the trigger message to a sensor and instrument data gathered from the instrument includes sensor data.

6. The method as claimed in claim 5, further comprising creating a streaming data bucket for the sensor on a cloud-based service.

7. The method as claimed in claim 1, wherein transmitting the trigger message to the at least one instrument comprises sending the trigger message to a test and measurement device, and instrument data comprises at least one of: a configuration of the test and measurement device; waveform data; measurement data; connections for channels on the test and measurement device; a type of a device under test; time stamp; date stamp; state information of the test and measurement device; and location.

8. The method as claimed in claim 1, further comprising acquiring an identifier of the at least one instrument prior to transmitting the trigger message, wherein the identifier comprises one of a QR code, a UPC code from the instrument using the communications device, or a user-provided selection from a menu of instrument identifiers on a user interface of the communications device.

9. A communications device, comprising:
   a camera having an actuator;
   at least one communications link;
   a memory; and
   a processor configured to execute instructions that cause the processor to:
   send an actuation signal to the camera to take a photograph of a test set up including an instrument and a configuration of the instrument when a user activates the actuator and, in response to the actuation signal, send a trigger message to the instrument cause the instrument to save instrument data;
   store the photograph in the memory with associated information about the photo including user information; and
   transmit at least the photo, associated information, and the user information to a remote location.

10. The communications device as claimed in claim 9, wherein the communications device comprises one of a smart phone, a tablet, or a computing device with a camera.

11. The communications device as claimed in claim 9, wherein the at least one communications link comprises at least one of the group consisting of: a cellular connection; wireless fidelity (Wi-Fi); near field communications (NFC); Ethernet; a USB connection; Z-wave; Bluetooth®; and Bluetooth® Low Energy.

12. The communications device as claimed in claim 9, wherein the instructions that cause the processor to send the trigger message also cause the processor to receive and store the instrument data from the instrument on the communications device.

13. The communications device as claimed in claim 12, wherein the instructions that cause the processor to transmit at least the photo, the associated information and the user information cause the process to include the instrument data from the instrument in the associated information.

14. The communications device as claimed in claim 9, wherein the instrument data includes at least one of images, waveforms, measurements, instrument configuration settings, sensor data, and instrument identification data.

15. The communications device of claim 9, wherein the processor is further configured to execute instructions that cause the processor to identify the instrument prior to sending the trigger message.

16. A test and measurement system, comprising:
   at least one communications link;

a communications device, and;
a test and measurement instrument, comprising:
  a memory; and
  a processor configured to execute instructions that cause the processor to:
receive a trigger message through the communications link from the communications device, the trigger message in response to a user sending an actuation signal to a camera to take a photograph of a test set up including an instrument and a configuration of the instrument;
save instrument data at that time into the memory upon reception of the trigger message; and
transmit the instrument data from the instrument to a location remote to the test and measurement device,
wherein the communications device transmits the photograph to the remote location.

17. The test and measurement device as claimed in claim 16, wherein the processor is further configured to execute instructions that cause the processor to send the trigger message through the communications link upon detection of the trigger message.

18. The test and measurement device as claimed in claim 16, wherein the processor is further configured to execute instructions that cause the processor to save information received through the communications link, wherein that information includes a photograph of the test and measurement device.

\* \* \* \* \*